(12) United States Patent
Silagy et al.

(10) Patent No.: US 8,377,354 B2
(45) Date of Patent: Feb. 19, 2013

(54) METHOD OF PRODUCING FILMS BY MEANS OF COEXTRUSION BLOW-MOULDING

(75) Inventors: David Silagy, Evreux (FR); Gérard Reignier, Fontaine l'Abbe (FR); Philippe Bussi, Bernay (FR)

(73) Assignee: Arkema France, Colombes (FR)

( * ) Notice: Subject to any disclaimer, the term of this patent is extended or adjusted under 35 U.S.C. 154(b) by 1288 days.

(21) Appl. No.: 10/493,126

(22) PCT Filed: Oct. 11, 2002

(86) PCT No.: PCT/FR02/03487
§ 371 (c)(1),
(2), (4) Date: Apr. 19, 2004

(87) PCT Pub. No.: WO03/039840
PCT Pub. Date: May 15, 2003

(65) Prior Publication Data
US 2005/0017397 A1  Jan. 27, 2005

(30) Foreign Application Priority Data
Oct. 19, 2001 (FR) ..................................... 01 13520

(51) Int. Cl.
*B32B 25/16* (2006.01)
*B29C 47/06* (2006.01)
*B29C 47/88* (2006.01)

(52) U.S. Cl. .................... 264/173.13; 264/139; 264/514; 264/563; 264/564; 264/171.27; 264/173.12; 264/173.16; 264/209.1; 264/209.3; 264/210.1; 264/211.12; 264/237

(58) Field of Classification Search .................. None
See application file for complete search history.

(56) References Cited

U.S. PATENT DOCUMENTS

| | | | |
|---|---|---|---|
| 3,821,182 A * | 6/1974 | Baird, Jr. et al. | 428/220 |
| 4,364,886 A * | 12/1982 | Strassel | 264/239 |
| 4,871,506 A | 10/1989 | Moulies et al. | |
| 5,242,976 A * | 9/1993 | Strassel et al. | 525/72 |
| 5,256,472 A * | 10/1993 | Moriya et al. | 428/215 |
| 5,968,657 A * | 10/1999 | Scullin et al. | 428/423.1 |
| 6,277,914 B1 * | 8/2001 | Oreins et al. | 525/70 |
| 6,303,224 B1 * | 10/2001 | Krahn et al. | 428/407 |
| 6,444,311 B1 * | 9/2002 | Friedman et al. | 428/354 |

FOREIGN PATENT DOCUMENTS

| | | | |
|---|---|---|---|
| WO | WO9963020 | * 12/1999 | |
| WO | WO 03/039840 A1 | 5/2003 | |

* cited by examiner

*Primary Examiner* — Jeffrey Wollschlager
(74) *Attorney, Agent, or Firm* — Thomas F. Roland

(57) ABSTRACT

The invention relates to a method of producing a film comprising at least one layer of a thermoplastic fluoro-polymer and at least one layer of another polymer (A). The inventive method consists in using extrusion blow molding to coextrude a fluoro-polymer and polymer (A) which adhere to one another; with a layer of another thermoplastic polymer (B) such that it forms a layer which is adjacent to the fluoropolymer/polymer (A) layer According to the invention, the thermoplastic polymer (B) is incompatible with the fluoro-polymer and polymer (A) and has adequate extrudate behavior to support the layers of fluoro-polymer and/or polymer (A). Once the coextrudate has been cooled, by separating the layer(s) of (B), at least the film is recovered, said film comprising at least one layer of a polymer selected from among thermoplastic fluoro-polymers and polymers (A).

12 Claims, No Drawings

METHOD OF PRODUCING FILMS BY MEANS OF COEXTRUSION BLOW-MOULDING

FIELD OF THE INVENTION

The present invention relates to a process for manufacturing films using the technique of tube blow coextrusion. Thin thermoplastic polymer films are usually obtained by the blow extrusion process, which consists in extruding, generally upwards, a thermoplastic polymer through an annular die, the extrudate being simultaneously pulled longitudinally by a pulling device, usually comprising rollers, and inflated by a constant volume of air trapped between the die, the pulling system and the wall of the tube. The inflated tube, also called a bubble, is generally cooled by an air blowing ring on leaving the die. The bubble, laid flat, is wound up, either in tube form or, after cutting, as two separate films.

BACKGROUND OF THE INVENTION

U.S. Pat. No. 4,871,506 explains that, in the case of semicrystalline fluid polymers, this tube blow extrusion process is at the very least tricky, if not impossible to use. In this case, the forces involved, such as the pulling force, the internal pressure in the bubble, gravity and other forces are applied to an extrudate whose mechanical strength is very low. This results in significant deformation of the bubble, leading to the formation of wrinkles in the film after the bubble has been laid flat, and to the complete absence of control of the distribution of film thickness.

The technique described in this patent U.S. Pat. No. 4,871,506 consists, using the blow coextrusion process, in coextruding the semicrystalline fluid polymer with a thermoplastic resin which is incompatible, in such a way that, after the bubble has been cooled and laid flat, the two extruded films are recovered separately by conventional means, such as by separate winding of the separated films. As examples of semicrystalline polymers, mention may be made of polyamides and their copolymers, polyesters such as polybutylene terephthalate (PBT) or polyethylene terephthalate (PET) and their copolymers, polypropylene, polyvinylidene fluoride and its copolymers, and ethylene-hydroxyalkyl ester copolymers (EVOH). Among incompatible thermoplastic resins that can be used, mention may be made of high-pressure polyethylenes, impact polystyrene and plasticized polyvinyl chloride.

The single example shows a bubble consisting of a 25 µm film of PVDF coextruded with a 60 µfilm of polyethylene. In the description, it is mentioned that the thickness of the film of incompatible thermoplastic resin (polyethylene) must preferably be from 1 to 5 times the thickness of the film of the semicrystalline polymer. It is also stated in the description that the coextrusion of more than two films is not excluded, but it is not known what films these are. In addition, in this technique the polyethylene film cannot be used as a film in itself and it must be recycled because it does not contain the necessary additives, such as antioxidants and UV stabilizers. If these additives are added thereto, the process, whose essential purpose is to produce a film of the semicrystalline polymer, is complicated. It is therefore desirable to reduce this thickness of the polyethylene film in order to reduce the amount that has to be recycled.

It has now been found that it is possible to produce, using the tube blow extrusion process, a film comprising a layer of fluoropolymer and a layer of another polymer (A), these two layers being adjacent, and a third layer of an incompatible polymer placed either on the same side as the fluoropolymer or on the same side as the polymer (A). The polymer (A) may be any polymer, for example an amorphous polymer, that is to say it is not necessary semicrystalline, and the thickness of the layer of incompatible polymer is not necessarily from one to five times the thickness of the combination formed by the layer of the fluoropolymer and the adjacent layer of the polymer (A). The layer of incompatible polymer is then separated.

It has also been found that it is possible to produce, using the tube blow extrusion process, a film comprising at least one layer of fluoropolymer containing fillers or at least one layer of polymer (A) and a layer of incompatible polymer. The layer of incompatible polymer is then separated.

SUMMARY OF THE INVENTION

The present invention relates to a process for manufacturing a film comprising at least one layer of a polymer chosen from thermoplastic fluoropolymers and polymers (A), in which blow extrusion process:
the following are coextruded:
  a) either at least one layer of a thermoplastic fluoropolymer and at least one layer of a polymer (A),
  b) or at least one layer of a thermoplastic fluoropolymer containing fillers and optionally at least one other fluoropolymer layer,
  c) or at least one layer of a polymer (A), the layers extruded in a), b) or c) adhering to one another,
  d) a layer of another thermoplastic polymer (B) so that it forms a layer adjacent to the combination of the layers extruded in a), b) or c),
  e) optionally, another layer of (B) adjacent to the combination of the layers extruded in a), b) or c), on the opposite side from the layer extruded in d);
the thermoplastic polymer (B) being incompatible with the fluoropolymer and the polymer (A) and possesses an extrudate strength sufficient to support the layers of fluoropolymer and/or of polymer (A);
after the coextrudate has been cooled, at least the film comprising at least one layer of a polymer chosen from thermoplastic fluoropolymers and the polymers (A) is recovered by separation from the layer(s) of (B).

DETAILED DESCRIPTION OF THE INVENTION

With regard to the fluoropolymer, this is understood to mean any polymer having in its chain at least one monomer chosen from compounds containing a vinyl group capable of opening in order to be polymerized and which contains, directly attached to this vinyl group, at least one fluorine atom, a fluoroalkyl group or a fluoroalkoxy group.

By way of example of monomers, mention may be made of vinyl fluoride; vinylidene fluoride (VF2); trifluoroethylene (VF3); chlorotrifluoroethylene (CTFE); 1,2-difluoroethylene; tetrafluoroethylene (TFE); hexafluoropropylene (HFP); perfluoro(alkyl vinyl) ethers such as perfluoro(methyl vinyl) ether (PMVE), perfluoro(ethyl vinyl) ether (PEVE) and perfluoro(propyl vinyl) ether (PPVE); perfluoro(1,3-dioxole); perfluoro(2,2-dimethyl-1,3-dioxole) (PDD); the product of formula $CF_2=CFOCF_2CF(CF_3)OCF_2CF_2X$ in which X is $SO_2F, CO_2H, CH_2OH, CH_2OCN$ or $CH_2OPO_3H$; the product of formula $CF_2=CFOCF_2CF_2SO_2F$; the product of formula $F(CF_2)_nCH_2OCF=CF_2$ in which n equals 1, 2, 3, 4 or 5; the product of formula $R_1CH_2OCF=CF_9$ in which $R_1$ is hydrogen or $F(CF_2)_z$ and z equals 1, 2, 3 or 4; the product of formula $R_3OCF=CH_2$ in which $R_3$ is $F(CF_2)_z$— and z is 1, 2, 3 or 4; perfluorobutylethylene (PFBE); 3,3,3-trifluoropropene and 2-trifluoro-methyl-3,3,3-tritluoro-1-propene.

The fluoropolymer may be a homopolymer or a copolymer; it may also comprise non-fluorinated monomers such as ethylene.

Advantageously, the fluoropolymer is chosen from:

vinylidene fluoride (VF2) homopolymers and copolymers preferably containing at least 50% by weight of VF2, the comonomer being chosen from chlorotrifluoroethylene (CTFE), hexafluoropropylene (HFP), trifluoroethylene (VF3) and tetrafluoroethylene (TFE);

trifluoroethylene (VF3) homopolymers and copolymers, copolymers, and especially terpolymers, combining the residues of the chlorotrifluoroethylene (CTFE), tetrafluoroethylene (TFE), hexafluoropropylene (HFP) and/or ethylene units and possibly VF2 and/or VF3 units.

Preferably, the fluoropolymer is a polyvinylidene fluoride (PVDF) homopolymer. Advantageously, the PVDF has a viscosity ranging from 100 Pa·s to 2000 Pa·s, the viscosity being measured at 230° C., with a shear rate of 100 $s^{-1}$ using a capillary rheometer. This is because such PVDFs are well suited to extrusion and to injection moulding. Preferably, the PVDF has a viscosity ranging from 300 Pa·s to 1200 Pa·s, the viscosity being measured at 230° C. with a shear rate of 100 $s^{-1}$ using a capillary rheometer.

Thus, the PVDFs sold under the brand name KYNAR® 710 or 720 are perfectly suited for this formulation.

With regard to the polymer (A), this has an affinity with the fluoropolymer for being possibly able to adhere to a layer of fluoropolymer. As examples of polymer (A), mention may be made of polyurethanes, polymers having blocks consisting of (meth)acrylate units, and acrylic polymers. For example (A) is an amorphous polymer.

Advantageously (A) is an acrylic polymer. This polymer essentially consists of alkyl(meth)acrylate units and may also include acid, acid chloride, alcohol and anhydride functional groups. By way of example mention may be made of alkyl (meth)acrylate homopolymers. Alkyl(meth)acrylates are described in KIRK-OTHMER, *Encyclopedia of Chemical Technology*, 4 th edition in Vol. 1, pages 292-3 and in Vol. 16, pages 475-478. Mention may also be made of copolymers of at least two of these (meth)acrylates and copolymers of at least one (meth)acrylate with at least one monomer chosen from acrylonitrile, butadiene, styrene and isoprene, provided that the proportion of (meth)acrylate is at least 50 mol %. Advantageously, (A) is PMMA. The MVI (melt volume index) of (A) may be between 2 and 15 $cm^3$/10 min measured at 230° C. under a load of 3.8 kg.

It would not be outside the scope of the invention if (A) were to be a blend of at least two acrylic polymers.

With regard to the layer of polymer (A), this advantageously contains, in addition to (A), a fluoropolymer which may be the same as that of the layer of fluoropolymer, optionally an acrylic impact modifier and optionally fillers such as, for example, titanium oxide. The layer of polymer (A) may also contain additives such as antioxidants and UV stabilizers.

The acrylic impact modifiers are, for example, random or block copolymers with at least one monomer chosen from styrene, butadiene, isoprene and at least one monomer chosen from acrylonitrile and alkyl(meth)acrylates. They may be of the core-shell type. These acrylic impact modifiers may also be present in (A) because they have been introduced during the polymerization of (A) or prepared simultaneously during the polymerization of (A). The core-shell copolymer is in the form of fine particles having an elastomer core and at least one thermoplastic shell, the particle size being generally less than 1 µm and advantageously between 800 and 500 nm. By way of example of the core, mention may be made of isoprene homopolymers or butadiene homopolymers, copolymers of isoprene with at most 30 mol % of a vinyl monomer and copolymers of butadiene with at most 30 mol % of a vinyl monomer. The vinyl monomer may be styrene, an alkylstyrene, acrylonitrile or an alkyl(meth)acrylate. Another core family consists of the homopolymers of an alkyl(meth)acrylate and the copolymers of an alkyl(meth)acrylate with at most 30 mol % of a vinyl monomer. The alkyl(meth)acrylate is advantageously butyl acrylate. The vinyl monomer may be styrene, an alkylstyrene, acrylonitrile, butadiene or isoprene. The core may be completely or partly crosslinked. All that is required is to add at least difunctional monomers during the preparation of the core; these monomers may be chosen from poly(meth)acrylic esters of polyols, such as butylene di(meth)acrylate and trimethylolpropane trimethacrylate. Other difunctional monomers are, for example, divinylbenzene, trivinylbenzene, vinyl acrylate and vinyl methacrylate. The core can also be crosslinked by introducing into it, by grafting or as a comonomer during the polymerization, unsaturated functional monomers such as anhydrides of unsaturated carboxylic acids, unsaturated carboxylic acids and unsaturated epoxides. Mention may be made, by way of example, of maleic anhydride, (meth)acrylic acid and glycidyl methacrylate. The shell(s) are styrene homopolymers, alkylstyrene homopolymers or methyl methacrylate homopolymers, or copolymers comprising at least 70 mol % of one of the above monomers and at least one comonomer chosen from the other above monomers, vinyl acetate and acrylonitrile. The shell may be functionalized by introducing into it, by grafting or as a comonomer during the polymerization, unsaturated functional monomers such as anhydrides of unsaturated carboxylic acids, unsaturated carboxylic acids and unsaturated epoxides. Mention may be made, for example, of maleic anhydride, (meth)acrylic acid and glycidyl methacrylate. By way of example, mention may be made of core-shell copolymers having a polystyrene shell and core-shell copolymers having a PMMA shell. There are also core-shell copolymers having two shells, one made of polystyrene and the other, on the outside, made of PMMA. Examples of core-shell copolymers and their method of preparation are described in the following patents: U.S. Pat. No. 4,180,494, U.S. Pat. No. 3,808,180, U.S. Pat. No. 4,096, 202, U.S. Pat. No. 4,260,693, U.S. Pat. No. 3,287,443, U.S. Pat. No. 3,657,391, U.S. Pat. No. 4,299,928 and U.S. Pat. No. 3,985,704. Advantageously, the core represents, by weight, 70 to 90% of the core-shell assembly and the shell represents 30 to 10%. By way of example of a core-shell copolymer, mention may be made of that consisting (i) of 75 to 80 parts of a core comprising at least 93 mol % of butadiene, 5 mol % of styrene and 0.5 to 1 mol % of divinylbenzene and (ii) of 25 to 20 parts of two shells essentially of the same weight, the inner one made of polystyrene and the outer one made of PMMA.

With regard to the advantageous forms of the layer of polymer (A), this layer comprises, by weight, the total being 100%:

40 to 90% of polymer (A);

0 to 35% of a fluoropolymer;

the balance to 100% of an acrylic impact modifier.

Preferably, the proportion of polymer (A) is between 40 and 55%. Preferably the proportion of fluoropolymer is between 20 and 30%.

The thickness of the layer of polymer (A) may be between 3 and 60 µm. Advantageously, the thickness of the layer of polymer (A) is between 8 and 40 µm and preferably between 10 and 35 µm.

The compound constituting the layer of polymer (A) may be prepared using any device for mixing thermoplastic polymers and recovered in the form of granules which are then put into one of the extruders, which feeds the die of the blow extrusion system, or else prepared directly by mixing its constituents in this extruder.

With regard to the layer of fluoropolymer, this advantageously contains, in addition to the fluoropolymer, a polymer (A) which may be the same as that of the layer of polymer (A) and optionally fillers such as, for example titanium oxide or other pigments. The layer of fluoropolymer may also contain additives such as antioxidants and UV stabilizers.

According to another form of the invention (option b) in the brief description of the invention, in which one or more layers of fluoropolymer containing fillers and optionally at least one other layer of fluoropolymer are extruded, but in which a layer of polymer (A) is not extruded, the proportion of fillers may be up to 40% by weight for 60% by weight of fluoropolymer. Advantageously, this proportion is between 5 and 30%.

With regard to the advantageous forms of the layer of fluoropolymer, this layer comprises, by weight, the total being 100%:
50 to 100% of fluoropolymer;
0 to 40% of a polymer (A);
the balance to 100% of fillers.
Preferably the proportion of fluoropolymer is between 50 and 85%. Preferably the proportion of polymer (A) is between 20 and 30%.

The thickness of the fluoropolymer layer may be between 5 and 60 µm. Advantageously, the thickness of the fluoropolymer layer is between 8 and 25 µm and preferably between 10 and 20 µm.

The compound constituting the layer of fluoropolymer may be prepared using any device for mixing thermoplastic polymers and recovered in the form of granules which are then put into one of the extruders, which feeds the die of the blow extrusion system, or else prepared directly by mixing its constituents in this extruder.

It would not be outside the scope of the invention if the film were to comprise two or more layers of fluoropolymer and/or two or more layers of polymer (A). Preferably, the additional layers of fluoropolymer are placed on the same side as the existing layer of fluoropolymer and the additional layers of polymer (A) are placed on the same side as the existing layer of polymer (A).

The process of the invention consists, using the blow coextrusion process, in coextruding the fluoropolymer and/or the polymer (A) with a thermoplastic polymer (B) which is incompatible, in such a way that, after the bubble has been cooled and laid flat, the film comprising the layer of fluoropolymer and/or the layer of polymer (A) and the film(s) of polymer (B) are recovered separately, such as by separate winding of the separated films. The incompatible thermoplastic polymer (B) must have no affinity, and in particular no adhesion affinity, with the fluoropolymer and with the polymer (A).

This polymer (B) must be such that, once it has been coextruded with the fluoropolymer and/or the polymer (A), its film can be separated without any effort from the fluoropolymer and/or from the polymer (A). This polymer (B), serving as support during the extrusion and blowing, must of course have an extrude strength, that is to say a hot melt strength, sufficient to withstand the extrusion and blowing stresses and to support the fluoropolymer and/or the polymer (A). To do this, it is recommended that this polymer possess a relatively high melt viscosity, of the order of $10^3$ to $10^4$ Pa·s at a shear rate of $100 \text{ s}^{-1}$, together with good shear strength and good tensile strength. Among polymers that can be used, mention may be made by way of examples of polyethylenes, impact polystyrene and plasticized polyvinyl chloride. Among polyethylenes, low-density polyethylene (LDPE) is preferred.

The relative thicknesses of the extruded materials in the extrudate are adjusted, on the one hand, according to the desired final thickness in the case of the fluoropolymer and/or the polymer (A) and, on the other hand, according to the strength of the bubble in the case of (B). In general, the thickness of the layer (or the sum of the thicknesses of the two layers) of the film of incompatible polymer (B) is from 0.3 to 2 times, and better still from 0.5 to 1 times, the sum of the thicknesses of the possible layer(s) of fluoropolymer and of the possible layer(s) of polymer (A). Furthermore, if it is wished not to retain the support film of thermoplastic polymer (B), it is possible to recycle it in the system in order to form a new support film.

EXAMPLES

We produced the films described in Table 1 according to the invention on a Kiefel machine equipped with 3 extruders, the characteristics of which are given in Table 2. These films were extruded through an annular die of spiral mandrel technology. Pressurised air was blown into the system so as to form a tube of variable diameter. The pressure of this air is characterised by the blow-up ratio, this being defined as the diameter of the tube divided by the diameter of the die. Table 1 specifies the value of this ratio for each example. The polyethylene was extruded at 200° C. and the polymers constituting the films were extruded at a temperature varying from 220° C. to 240° C. These films were formed from the following base constituents:

Polymer TC1, consisting of 80 wt % of KYNAR® 720 (a PVDF homopolymer from Atofina, having an MVI (melt volume index) of 10 cm$^3$/10 min (230° C./5 kg)) and 20 wt % of OROGLAS® V 825 T (a PMMA from Atoglas, having an MVI of 2.5 cm$^3$/10 min (230° C./3.8 kg);

Polymer TC3, consisting of 50 wt % of KYNAR® 720 (a PVDF homopolymer from Atofina, having an MVI (melt volume index) of 10$^3$/10 min (230° C./5 kg)), 20 wt % of OROGLAS® BS8 (a PMMA from Atoglas), having an MVI of 4.5 cm$^3$/10 min (230° C./3.8 kg), in bead form and containing a methyl acrylate comonomer at a level of 12%, and 30 wt % of titanium dioxide:

Polymer TC4, consisting of 60 wt % of KYNAR® 720 (a PVDF homopolymer from Atofina, having an MVI (melt volume index) of 10 cm$^3$/10 min (230° C./5 kg)), 15 wt % of OROGLAS® V 825 T (a PMMA from Atoglas), having an MVI of 2.5 cm$^3$/10 min (230° C./3.8 kg), 10 wt % of OROGLAS® BS8 (a PMMA from Atoglas), having an MVI of 4.5 cm$^3$/10 min (230° C./3.8 kg) in bead form and containing a methyl acrylate comonomer at a level of 12%, and 15 wt % of titanium dioxide;

Polymer TC5, consisting of 53 wt % of KYNAR® 720 (a PVDF homopolymer from Atofina, having an MVI (melt volume index) of 10 cm$^3$/10 min (230° C./5 kg)), 9 wt % of OROGLAS® V 825 T (a PMMA from Atoglas), having an MFI (melt flow index) of 2.5 g/10 min (230° C./3.8 kg), 15.2 wt % of OROGLAS® BS8 (a PMMA from Atoglas), having an MVI of 4.5 cm$^3$/10 min (230° C./3.8 kg), in bead form and containing a methyl acrylate comonomer at a level of 12%, and 22.8 wt % of titanium dioxide;

Polymer L2, consisting of 25 wt % of KYNAR® 720 (a PVDF homopolymer from Atofina, having an MVI (melt volume index) of 10 cm³/10 min (230° C./5 kg)), 47 wt % of OROGLAS® V 825 T (a PMMA from Atoglas), having an MVI of 2.5 cm³/10 min (230° C./3.8 kg), 28 wt % of an acrylic core-shell copolymer called DURASTRENGTH® D320 from Atofina, having a size of about 80 nm, and an ultraviolet absorber having a high molecular mass from the benzotriazole family; and Polymer Lacqtene 1003 FE23, a low-density polyethylene from Atofina, having an MVI (melt volume index) of 0.5 cm³/10 min (190° C./2.16 kg) and a density of 0.923 g/cm³.

TABLE 1

| Ex | Polymer in extruder 1 (thickness) | Polymer in extruder 2 (thickness) | Polymer in extruder 3 (thickness) | gap Die Diameter (mm) | Blow-up ratio | Quality of the film |
|---|---|---|---|---|---|---|
| Ex. 1 | TC1 (20 µm) | L2 (30 µm) | LACQTENE 1003FE23 (15 µm) | 1.2 225 | 1.98 | Stable bubble |
| Ex. 2 | TC3 (10 µm) | L2 (20 µm) | LACQTENE 1003FE23 (25 µm) | 0.8 225 | 1.7 | Stable bubble |
| Ex. 3 (comp.) | TC3 (10 µm) | L2 (10 µm) | L2 (10 µm) | 0.8 225 | 1.7 | Unstable bubble |
| Ex. 4 | TC4 (15 µm) | L2 (15 µm) | LACQTENE 1003FE23 (25 µm) | 0.8 225 | 1.7 | Stable bubble |
| Ex. 5 | TC4 (15 µm) | L2 (10 µm) | L2 (5 µm) | 0.8 225 | 1.7 | Unstable bubble |
| Ex. 6 | LACQTENE 1003FE23 (25 µm) | LACQTENE 1003FE23 (25 µm) | TC5 (25 µm) | 1.2 150 | 2.5 | Stable bubble |
| Ex. 7 (comp.) | TC5 (8 µm) | TC5 (8 µm) | TC5 (9 µm) | 1.2 150 | 2.5 | Unstable bubble |
| Ex. 8 | LACQTENE 1003FE23 (25 µm) | LACQTENE 1003FE23 (25 µm) | TC5 (50 µm) | 1.2 150 | 2.5 | Stable bubble |
| Ex. 9 (Comp.) | TC5 (17 µm) | TC5 (17 µm) | TC5 (16 µm) | 1.2 150 | 2.5 | Unstable bubble |

TABLE 2

Description of the Extruders

| | Screw diameter in mm | Length/diameter |
|---|---|---|
| Extruder 1 | 60 | 29 |
| Extruder 2 | 50 | 25 |
| Extruder 3 | 50 | 29 |

What is claimed is:

1. A process for manufacturing a film consisting of one layer of a thermoplastic fluoropolymer and one layer of a polymer (A), in which blow extrusion process comprises the steps of
   1) coextruding in order a multi-layer film consisting of:
      a) one layer of a thermoplastic fluoropolymer, wherein said fluoropolymer comprises a polyvinylidene fluoride homopolymer or copolymer containing at least 50% by weight of vinylidene fluoride;
      b) one layer of a polymer (A), wherein polymer (A) comprises an acrylic polymer having at least 50 mol % of (meth)acrylate;
      c) one layer of another thermoplastic polymer (B), wherein the thermoplastic polymer (B) being incompatible with the fluoropolymer and the polymer (A) and possesses an extrudate strength sufficient to support the layers of fluoropolymer and polymer (A), and
   wherein said layers of a), b) and c) are adjacent to each other in the order a), b), c), wherein polymer (A) has affinity for and adheres to the fluoropolymer, and wherein polymer (B) has no adhesion affinity with polymer (A);
   2) cooling the coextrudate; and
   3) recovering by separation from the layer of (B) the film consisting of the layers of a) and b),
   wherein the thickness of the layer of the film of incompatible polymer (B) is from 0.3 to 2 times the sum of the thickness of the fluoropolymer layer and of the layer of polymer (A).

2. The process according to claim 1, in which the fluoropolymer comprises a PVDF homopolymer.

3. The process according to claim 1 in which the layer of polymer (A) comprises, by weight, the total being 100%:
   40 to 90% of polymer (A);
   0 to 35% of a fluoropolymer;
   the balance to 100% of an acrylic impact modifier.

4. The process according to claim 1, in which the layer of fluoropolymer a) comprises, by weight, the total being 100%:
   50 to 100% of fluoropolymer;
   0 to 40% of a an acrylic polymer;
   the balance to 100% of fillers.

5. The process according to claim 1, in which the thickness of the layer of polymer (A) is between 3 and 60 µm.

6. The process according to claim 5, in which the thickness of the layer of polymer (A) is between 8 and 40 µm.

7. The process according to claim 6, in which the thickness of the layer of polymer (A) is between 10 and 35 µm.

8. The process according to claim 1, in which the thickness of the fluoropolymer layer a) is between 5 and 60 µm.

9. The process according to claim 8, in which the thickness of the fluoropolymer layer is between 8 and 25 µm.

10. The process according to claim 9, in which the thickness of the fluoropolymer layer is between 10 and 20 μm.

11. The process according to claim 1, in which the thermoplastic polymer (B) is polyethylene.

12. The process of claim 1, wherein the fluoropolymer a) further comprises fillers, impact modifiers, or both.

* * * * *